(12) United States Patent
Lee et al.

(10) Patent No.: US 8,335,284 B1
(45) Date of Patent: Dec. 18, 2012

(54) SYSTEM AND METHOD FOR INTER-CHANNEL INTERFERENCE REDUCTION

(75) Inventors: Gaspar Lee, Bade (TW); Hao-Ren Cheng, Yuanli Township (TW); Chih-Yuan Chu, Hsinchu (TW); Kuang-Chung Ou, Kaohsiung (TW)

(73) Assignee: Qualcomm Atheros, Inc., San Jose, CA (US)

( * ) Notice: Subject to any disclaimer, the term of this patent is extended or adjusted under 35 U.S.C. 154(b) by 944 days.

(21) Appl. No.: 12/398,952

(22) Filed: Mar. 5, 2009

(51) Int. Cl.
*H03D 1/04* (2006.01)

(52) U.S. Cl. ........ 375/346; 375/376; 375/260; 375/347; 375/348; 375/350; 375/267

(58) Field of Classification Search .................. 375/346, 375/260, 347, 348, 350, 267
See application file for complete search history.

(56) References Cited

U.S. PATENT DOCUMENTS

| | | | |
|---|---|---|---|
| 2007/0211827 A1* | 9/2007 | Baggen et al. | 375/316 |
| 2010/0166126 A1* | 7/2010 | Matsumura et al. | 375/350 |

* cited by examiner

*Primary Examiner* — Kabir A Timory
(74) *Attorney, Agent, or Firm* — Bever, Hoffman & Harms, LLP (57) ABSTRACT

An apparatus and method in a multiple sub-carrier digital communication receiver for reducing inter-channel interference (ICI) includes a channel estimation block for calculating channel estimates, an interpolation block for calculating interpolated channel estimates, and an ICI reduction block for calculating ICI reduced receive symbols. Channel estimates are calculated based on receive symbols or ICI reduced receive symbols using pre-determined transmit symbols. Interpolated channel estimates are calculated by Wiener filter interpolation of a set of channel estimates. ICI estimates are calculated based on a set of interpolated channel estimates and either receive symbols or ICI reduced receive symbols. ICI reduced receive symbols are generated by subtracting ICI estimates from receive symbols.

16 Claims, 8 Drawing Sheets

SYSTEM AND METHOD FOR INTER-CHANNEL INTERFERENCE REDUCTION

BACKGROUND OF THE INVENTION

1. Field of the Invention

The present invention relates to interference reduction in digital communication systems in general and more specifically to inter-channel interference reduction in mobile, wireless OFDM systems.

2. Description of the Related Art

Advanced multimedia services continue to drive requirements for increasing data rates and higher performance in wireless systems. High performance communication systems such as those specified by the European terrestrial digital video broadcasting (DVB-T) standard and the Japanese integrated services digital broadcasting terrestrial standard (ISDB-T) may use communication methods based on Orthogonal Frequency Division Multiplexing (OFDM). The performance of an OFDM receiver may be sensitive to inter-channel interference between different sub-carrier frequencies in a time-varying environment, such as for a mobile, wireless device.

A received OFDM symbol in an OFDM system may consist of both data and pilot synchronization information transmitted on multiple sub-carriers multiplexed together and spanning multiple sample periods. Modulation and demodulation in an OFDM system may use an inverse fast Fourier transform (IFFT) at the transmitter and an FFT at the receiver respectively. At the transmitter, a cyclic prefix of a section of the IFFT output for each OFDM symbol may be appended to the beginning of the OFDM symbol as a guard interval (GI) to provide some protection from inter-symbol interference (ISI). The length of the OFDM symbol before adding the guard interval may be known as the useful symbol period duration. At the receiver, the cyclic prefix (guard interval) may be removed prior to the FFT demodulation by positioning appropriately an FFT window, whose size may be equal to the useful symbol period duration, along a received sample sequence. The FFT demodulation may transform the window of received time domain samples, in the received sample sequence, to a frequency domain (OFDM) symbol. While the addition of the cyclic prefix guards against ISI, it may not compensate for inter-channel interference (ICI) that may occur between sub-carriers in an OFDM symbol when the communication channel varies in time during the OFDM symbol.

Prior art techniques for ICI mitigation may estimate an amount of ICI in a receive OFDM symbol by estimating the communication channel's frequency domain transfer characteristic, the rate of change of the transfer characteristic and the transmitted OFDM symbol. An ICI estimate may then be subtracted from the receive OFDM symbol, thereby resulting in an ICI-reduced receive OFDM symbol. The performance of the ICI mitigation method may depend on the quality of these estimates, especially in a rapidly time-varying mobile environment. Some prior art methods to provide accurate estimates may be too complex and costly to implement, while others may be too simple to provide excellent performance. Thus, there exists a need for a readily implementable ICI reduction technique that estimates the ICI accurately and exhibits high performance in a mobile environment.

SUMMARY OF THE INVENTION

An apparatus and method in a multiple sub-carrier digital communication receiver for reducing inter-channel interference (ICI) are provided. The apparatus and method can include a channel estimation block for calculating channel estimates, an interpolation block for calculating interpolated channel estimates, and an ICI reduction block for calculating ICI reduced receive symbols. Channel estimates are calculated based on receive symbols or ICI reduced receive symbols using pre-determined transmit symbols. Interpolated channel estimates are calculated by Wiener filter interpolation of a set of channel estimates. ICI estimates are calculated based on a set of interpolated channel estimates and either receive symbols or ICI reduced receive symbols. ICI reduced receive symbols are generated by subtracting ICI estimates from receive symbols.

DETAILED DESCRIPTION

Figure 1:
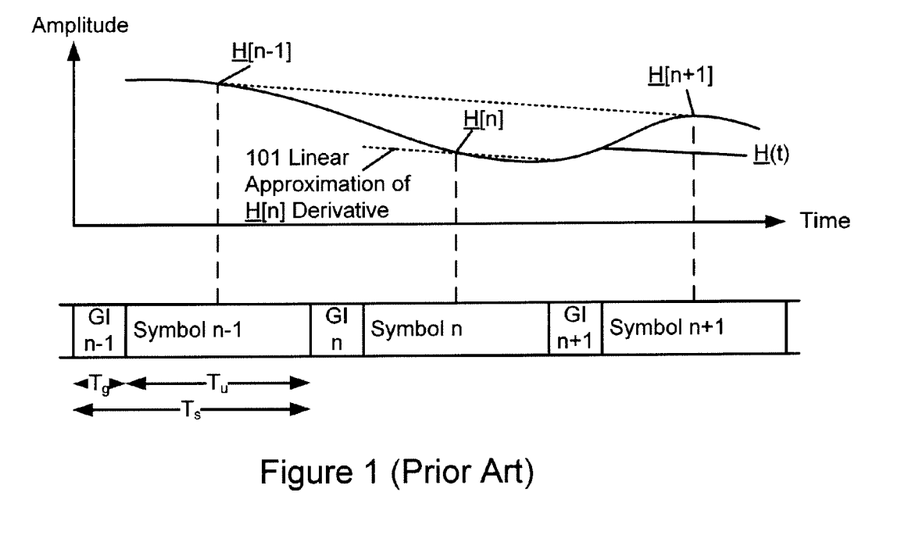
FIG. 1 illustrates graphically a linear approximation of a derivative of a channel transfer characteristic.

FIG. 1 illustrates graphically a sequence of three OFDM symbols, each OFDM symbol spanning a total time period of length $T_s$ comprised of a useful time period of length $T_u$ and a guard interval time period of length $T_g$. During each OFDM symbol's transmission through a communications channel, a continuous time, frequency domain channel characteristic $\underline{H}(t)$ of the communications channel may vary, particularly for a mobile OFDM receiver. (The underline notation used in this specification indicates that a vector that includes a plurality of values at a plurality of sub-carriers in an OFDM symbol.) Calculating a discrete time channel characteristic using OFDM symbols output from the FFT demodulation may result in the series of discrete time, frequency domain channel estimates $\underline{H}[n-1]$, $\underline{H}[n]$, and $\underline{H}[n+1]$, where $\underline{H}[n]$ may provide an average value of $\underline{H}(t)$ for an $n^{th}$ OFDM symbol. To account for the time variation of the channel during an OFDM symbol, one may approximate the rate of change, i.e. the derivative, of $\underline{H}[n]$ by a difference between the previous value $\underline{H}[n-1]$ and the succeeding value $\underline{H}[n+1]$. Thus $\Delta \underline{H}[n] \approx (\underline{H}[n+1] - \underline{H}[n-1])/T_s$. An OFDM receive symbol $\underline{Y}[n]$ through a communication channel with a transfer characteristic H[n] for the $n^{th}$ OFDM symbol may then be approximated by Equation (1) as $$\underline{Y}[n] \approx \text{diag}\{\underline{H}[n]\}\underline{X}[n] + \Xi \text{diag}\{\Delta \underline{H}[n]\}\underline{X}[n] + \underline{N}[n]. \quad (1)$$

The notation diag{·} may indicate a diagonal matrix and $\Xi$ may indicate a fixed ICI spreading matrix as detailed in Equation (2). X[n] may denote a transmitted symbol, and the first term in Equation (1) may represent an ICI-free receive symbol, while the third term N[n] may represent additive noise. The second term in Equation (1) may represent additive ICI.

$$\Xi = \begin{bmatrix} 0 & \zeta_1 & \zeta_2 & \cdots & \zeta_{N-2} & \zeta_{N-1} \\ \zeta_{-1} & 0 & \zeta_1 & \cdots & \zeta_{N-2} & \zeta_{N-2} \\ \zeta_{-2} & \zeta_{-1} & 0 & \zeta_1 & \cdots & \zeta_{N-2} \\ \vdots & \zeta_{-2} & \zeta_{-1} & \ddots & \ddots & \vdots \\ \zeta_{2-N} & \vdots & \vdots & \ddots & 0 & \zeta_1 \\ \zeta_{1-N} & \zeta_{2-N} & \zeta_{3-N} & \cdots & \zeta_{-1} & 0 \end{bmatrix}, \zeta_n = \frac{1}{N}\sum_{k=0}^{N-1} k e^{j\frac{1}{2\pi}nk} \quad (2)$$

Figure 2:
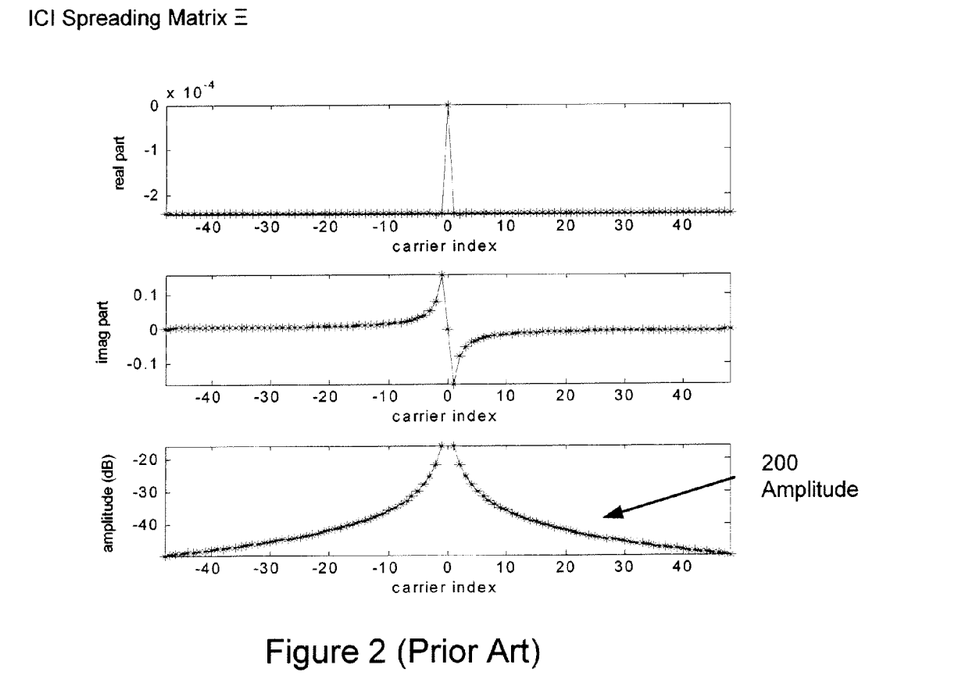
FIG. 2 illustrates the amplitude of a spreading matrix about a nominal carrier index.

FIG. 2 illustrates the real part, imaginary part and amplitude of elements of the ICI spreading matrix $\Xi$. Note that $\Xi$ may be a constant Toeplitz matrix such that all diagonals have the same value and $\zeta_{-n} = \zeta^*_n$. Based on the amplitude 200 roll-off indicated in FIG. 2, sub-carriers within +/−20 positions of a particular sub-carrier contribute most of the ICI to that sub-carrier. As such, not all sub-carriers need to be included in an ICI estimate for a particular sub-carrier.

An "ICI-free" estimate $\hat{Y}_k$ based on a received OFDM symbol $Y_k$ for a sub-carrier k may be generated by Equation (3). (The "time" notation [n] has been omitted for clarity.)

$$\tilde{Y}_k = Y_k - \sum_{\substack{k'=k-N_c \\ k' \neq k}}^{k+N_c} \tilde{H}_{k,k'} \hat{X}_k \quad (3)$$

$$\tilde{H} = \text{diag}\{H\} + \Xi \text{diag}\{\Delta H\}$$

An estimated channel matrix $\tilde{H}$ may be fully characterized by H and $\Delta$H. The term $\hat{X}_k$ may be an estimate of the transmitted data for the k-th sub-carrier. Scattered pilots may be transmitted on a subset of sub-carriers during one or more OFDM symbols, thereby providing a known transmitted value. Transmitted values on other sub-carriers may need to be estimated. The summation in Equation (3) may only span a range of $2N_C$ sub-carriers about the $k^{th}$ sub-carrier, as sub-carriers further away may contributed only a negligible amount. The accuracy of an ICI-free estimate $\tilde{Y}_k$ may depend on the accuracy of estimating the constituent components H, $\Delta$H, and $\hat{X}_k$.

Figure 3:
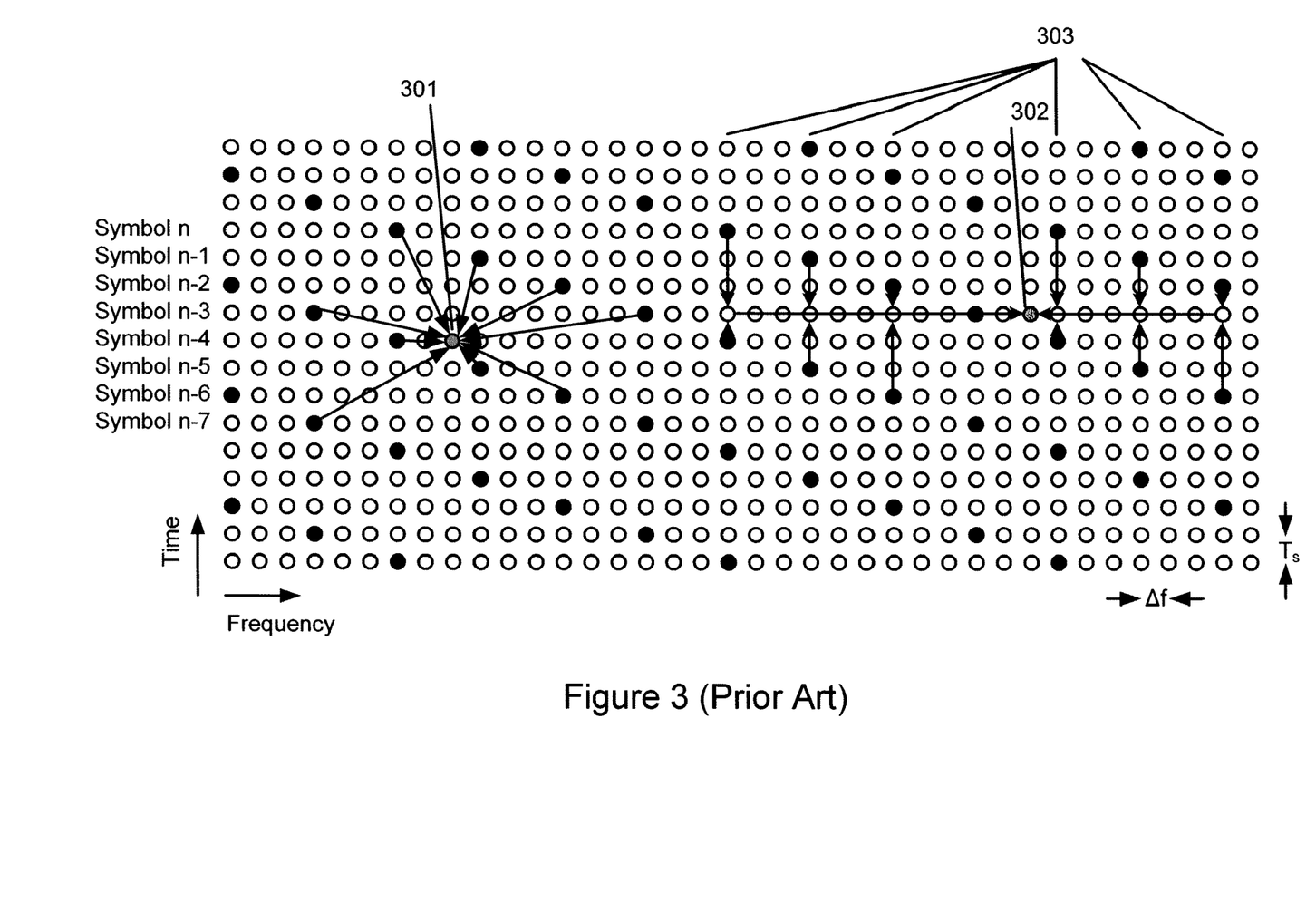
FIG. 3 illustrates two different Wiener filter interpolation methods for a channel estimate based on scattered pilot symbols.

The channel transfer characteristic H may vary both in time and frequency. At a receiver in an OFDM system that uses coherent demodulation, the channel transfer characteristic H may be estimated using known pilot values transmitted on certain sub-carriers. FIG. 3 illustrates a sequence of OFDM symbols spaced $T_S$ time units apart with sub-carriers in each OFDM symbol spaced $\Delta$f frequency units apart. Every third sub-carrier may carry scattered pilots with pre-determined transmit values in certain OFDM symbols. An estimate of the channel transfer characteristic at the scattered pilot positions may be determined using receive symbol values and the known pre-determined transmitted pilot values. A two-dimensional Wiener interpolation filter may be used to generate an estimate of the channel transfer characteristic in other sub-carriers such as position 301 based on channel estimates generated from a set of nearby scattered pilots. Alternatively, two one-dimensional Wiener interpolation filters may be used sequentially as illustrated for position 302, one interpolation in time (i.e. within columns 303) followed by an interpolation in frequency (i.e. within the row for OFDM symbol n−3). Wiener interpolation filters may thus be used to generate a set of channel estimates for all sub-carriers in an OFDM symbol, i.e. to generate an estimate $\hat{H}$ of the channel transfer characteristic H. The rate of change of the channel transfer characteristic $\overline{\Delta H}$ may be estimated by a simple linear approximation using two separate channel transfer characteristic estimates generated for two different OFDM symbols. For example $$\Delta \hat{H}[n] \approx \frac{\hat{H}[n+1] - \hat{H}[n-1]}{2T_s} \quad (4)$$

or $$\Delta \hat{H}[n] \approx \frac{\hat{H}[n] - \hat{H}[n-1]}{T_s} \quad (5)$$

An estimate for the channel matrix $\tilde{H}[n]$ for the $n^{th}$ OFDM symbol may then be generated from the estimates for $\Delta H[n]$ and H[n] using Equation (3). An estimate of a transmitted symbol for the $k^{th}$ sub-carrier in an OFDM symbol may be estimated by a one-tap minimum mean-squared error (MMSE) equalizer as $$\hat{X}_k \approx \frac{Y_k \tilde{H}^*_{k,k}}{|\tilde{H}_{k,k}|^2 + SINR^{-1}} \quad (6)$$

where SINR indicates a signal to interference plus noise ratio calculated by summing the ICI and noise power. The notation $\tilde{H}_{k,k}[n]$ indicates the $k^{th}$ diagonal entry of the matrix $\tilde{H}[n]$. If the ICI is much larger than the noise power, as may occur in a highly mobile environment, then $SINR^{-1}$ may be estimated as $$SINR^{-1} \approx \sum_{\substack{k'=k-N_C \\ k' \neq k}}^{k+N_c} \tilde{H}_{k,k'} \hat{X}_k \quad (7)$$

Figure 4:
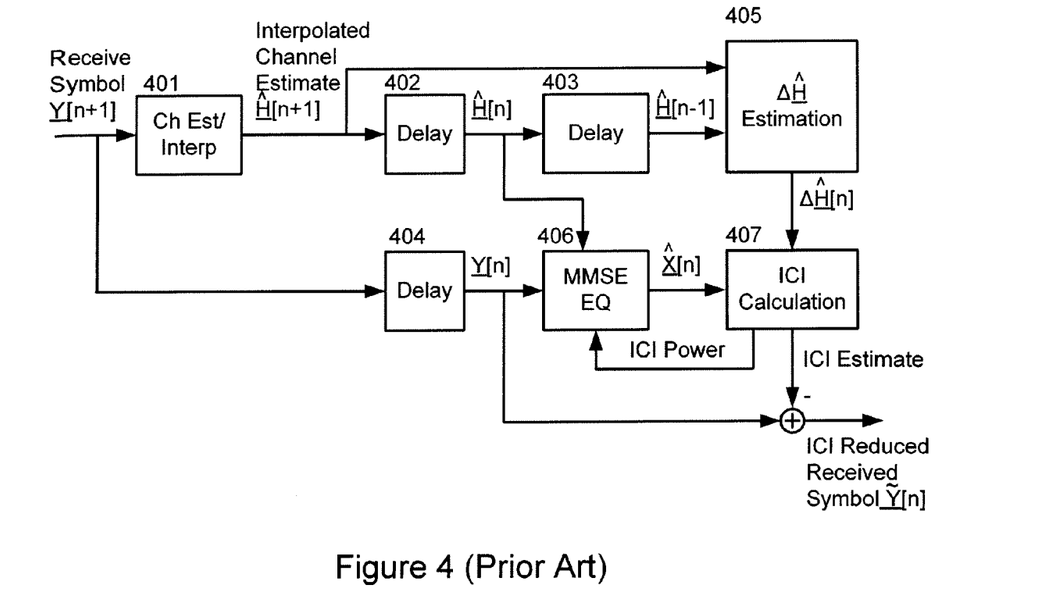
FIG. 4 illustrates a prior art apparatus for inter-channel interference reduction using a single iteration.

FIG. 4 illustrates an apparatus to generate an ICI reduced receive symbol $\tilde{Y}[n]$ from a set of received symbols. For each receive symbol $\overline{Y}[k]$, a channel estimation and interpolation block 401 may generate channel estimates H[k] for specific sub-carriers using pre-determined scattered pilots. An interpolated channel estimate $\hat{H}[n]$ for all sub-carriers in the $n^{th}$ symbol may then be interpolated from a set of channel estimates {H[k], k=n−3, . . . , n+3} as described for FIG. 3. An estimate of the derivative in time of $\hat{H}[n]$ may be generated by block 405 using two interpolated channel estimates for adjacent symbols as in Equation (4). An estimate of a transmitted symbol $\hat{X}[n]$ may be determined by a minimum mean-squared error equalizer 406, and an ICI calculation block 407 may generate an estimate of the ICI within a receive symbol Y[n] using the transmitted symbol estimate $\hat{X}[n]$ and the derivative estimate $\Delta\hat{H}[n]$. An ICI reduced receive symbol estimate $\tilde{Y}[n]$ may then be computed by subtracting the ICI estimate from the receive symbol Y[n]. The quality of the "ICI-free" estimate $\tilde{Y}[n]$ may depend on the accuracy of the estimates $\hat{X}[n]$, $\hat{H}[n]$ and $\Delta\hat{H}[n]$. Notably, the prior art estimation illustrated in FIG. 4 does not feed back information from prior estimates.

Figure 5:
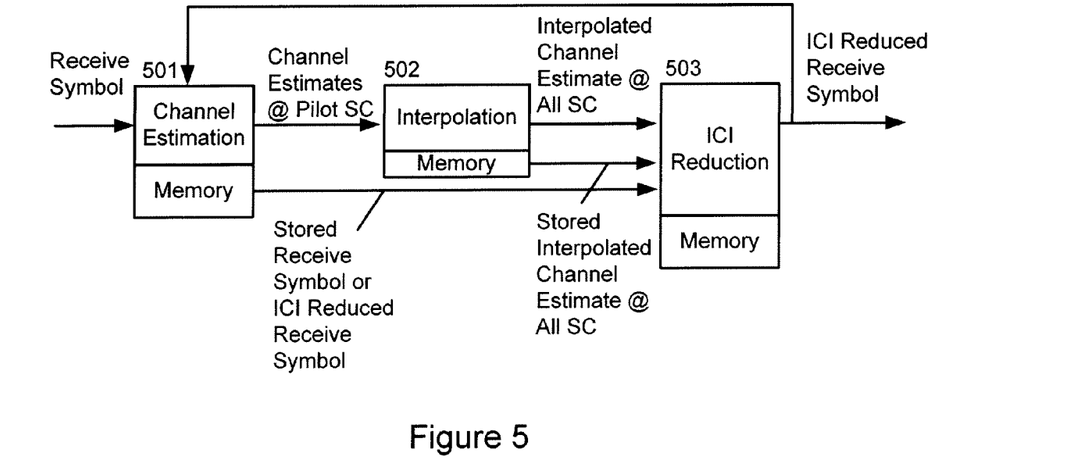
FIG. 5 illustrates an apparatus for inter-channel interference reduction using multiple iterations with feedback.

FIG. 5 illustrates an apparatus to estimate an ICI reduced receive symbol that includes feedback as well as local memory to store prior estimates to improve the accuracy of the estimation. A channel estimation block 501 may generate channel estimates at pilot sub-carriers based on a receive symbol for a current OFDM symbol as well as based on an ICI reduced receive symbol for a past OFDM symbol. Channel estimates based on the ICI reduced receive symbol may be more accurate as ICI has been removed before estimation. An interpolation block 502 may generate an interpolated channel estimate at all sub-carriers by Wiener filter interpolation using a set of channel estimates at pilot sub-carriers generated and stored in memory by the channel estimation block 501. The accuracy of the interpolated channel estimates may be improved by using more channel estimates generated from ICI reduced receive symbols than from receive symbols that include ICI. As the ICI in Equation (3) depends directly on the interpolated channel estimates, the accuracy of the ICI estimation may therefore be improved as well. An ICI reduction block 503 may estimate ICI for a receive symbol and subtract the estimated ICI to generate an ICI reduced receive symbol following Equation (3). If the ICI reduction block 503 estimates the ICI based on information derived from past ICI reduced receive symbols, then the ICI estimate may have increased accuracy. Specifically, the ICI reduction block 503 may generate an "improved" ICI reduced estimate compared to the prior art.

Figure 6:
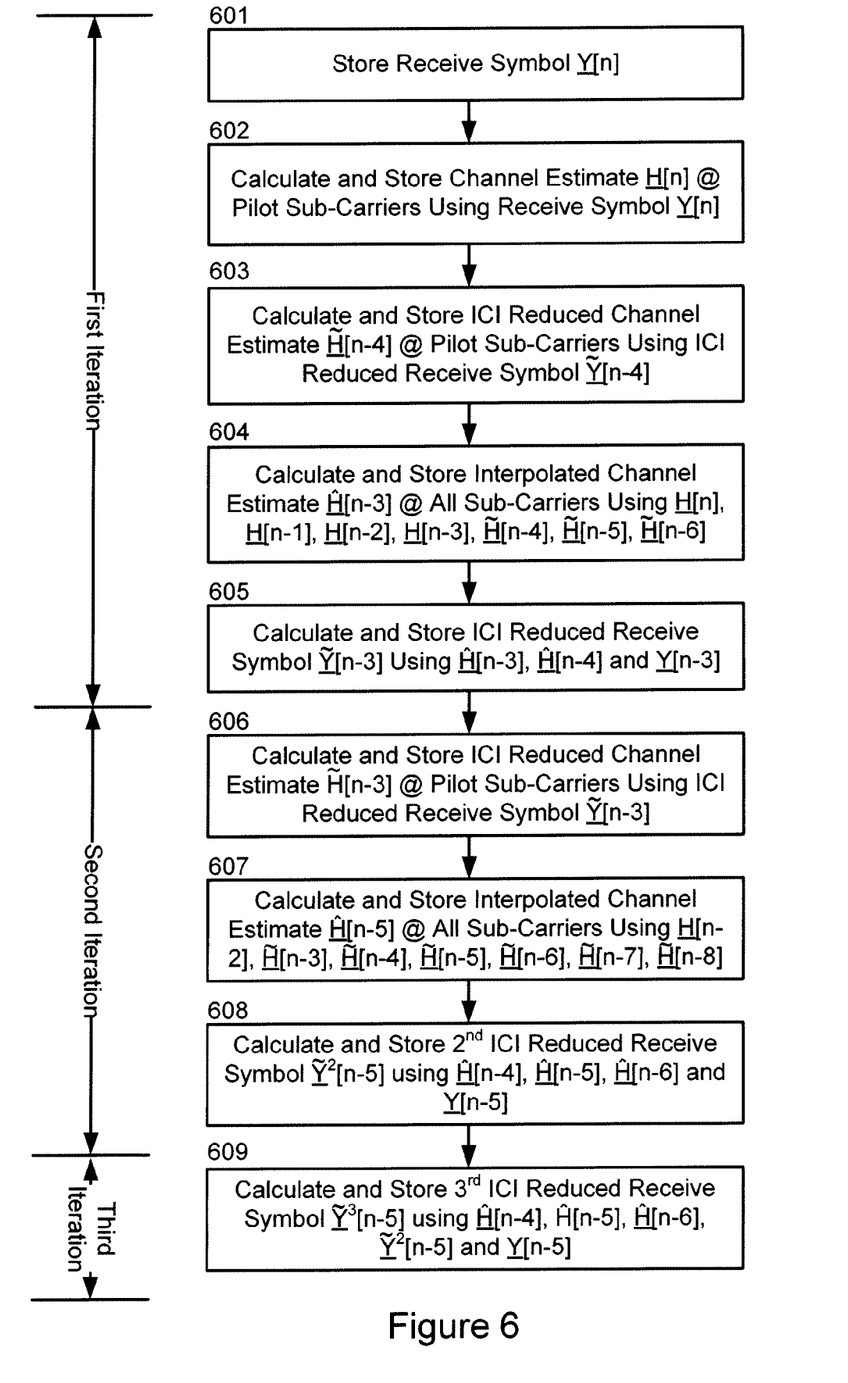
FIG. 6 illustrates a method for inter-channel interference reduction using three iterations with feedback.

FIG. 6 details a method for generating an estimate of an ICI reduced receive symbol using three iterations of ICI estimation and ICI reduction. As shown in FIG. 6, a first iteration includes steps 601-605, a second iteration includes steps 606-608, and a third iteration includes step 609. In step 601, each received OFDM symbol Y[n] may be stored in a local memory for use in subsequent operations. In step 602 a channel estimate H[n] may be calculated at pilot sub-carriers based on known pre-determined transmit pilot symbols. In step 603, an ICI reduced channel estimate $\tilde{H}[n-4]$ at pilot sub-carriers may be generated and stored based on an ICI reduced channel estimate $\tilde{Y}[n-4]$ calculated from a previously received symbol Y[n-4]. In step 604, an interpolated channel estimate $\hat{H}[n-3]$ for all sub-carriers may be generated and stored using a set of stored channel estimates including both initially generated channel estimates H[n], H[n-1], H[n-2], H[n-3] and ICI reduced channel estimates $\tilde{H}[n-4]$, $\tilde{H}[n-5]$ and $\tilde{H}[n-6]$. Including some ICI reduced channel estimates in the interpolation may improve the accuracy of the interpolated channel estimate $\hat{H}[n-3]$ over an estimate based solely on channel estimates directly derived from receive symbols. In step 605, an ICI reduced receive symbol $\tilde{Y}[n-3]$ may be calculated from the interpolated channel estimates $\hat{H}[n-3]$, $\hat{H}[n-4]$ and the receive symbol Y[n-3] using Equations (3), (5), (6) and (7) above.

The second iteration of the improved ICI reduction method, which includes steps 606-607, may generate an improved ICI reduced receive symbol for an earlier receive symbol. In step 606, an ICI reduced channel estimate $\tilde{H}[n-3]$ at pilot sub-carriers may be generated based on the ICI reduced receive symbol $\tilde{Y}[n-3]$ generated in step 605. This resembles step 603 in the first iteration. In step 607, an interpolated channel estimate $\hat{H}[n-5]$ may be generated and stored using a set of estimates $\overline{H}[n-2]$, $\tilde{H}[n-3]$, $\tilde{H}[n-4]$, $\tilde{H}[n-5]$, $\tilde{H}[n-6]$, $\tilde{H}[n-7]$ and $\tilde{H}[n-8]$, similar to step 604 in the first iteration except that the set of estimates include more ICI reduced channel estimates, thereby improving the accuracy of the interpolation. In step 608 an "improved" $2^{nd}$ ICI reduced channel estimate $\tilde{Y}^2[n-5]$ may be calculated from the interpolated channel estimates $\hat{H}[n-4]$, $\hat{H}[n-5]$, $\hat{H}[n-6]$ and the receive symbol Y[n-5] using Equations (3), (4), (6) and (7). The $2^{nd}$ ICI reduced channel estimate $\tilde{Y}^2[n-5]$ calculated in the second iteration may have improved accuracy over the equivalent estimate $\tilde{Y}[n-5]$ calculated in the first iteration, because the intermediate operations may be based on more accurately estimated inputs with reduced ICI. This ends a second iteration of the improved ICI reduction method.

The third iteration of the improved ICI reduction method, which includes step 609, may generate a further improved $3^{rd}$ ICI reduced receive symbol using the ICI reduced receive symbol calculated in the second iteration. In step 609, a $3^{rd}$ ICI reduced receive symbol $\tilde{Y}^3[n-5]$ may be calculated from the interpolated channel estimates $\hat{H}[n-4]$, $\hat{H}[n-5]$, $\hat{H}[n-6]$, the $2^{nd}$ ICI reduced receive symbol $\tilde{Y}_2[n-5]$ and the receive symbol Y[n-5] using Equations (3), (4), (6) and (7). This step resembles step 608 of the second iteration except that the ICI reduced receive symbol $\tilde{Y}^2[n-5]$ may be used rather than the initial receive symbol Y[n-5] to calculate a $2^{nd}$ estimated transmit symbol $\hat{X}^2[n-5]$ used in generating a more accurate ICI estimate. The more accurate ICI estimate may then be subtracted from the receive symbol Y[n-5] to produce the $3^{rd}$ ICI reduced receive symbol $\tilde{Y}^3[n-5]$. Each of the iterations outlined in FIG. 6 may provide a more accurate ICI reduced estimate than the prior art. ICI reduced estimates generated from earlier symbols may be used in subsequent ICI reduction steps to improve the accuracy of channel estimation, interpolation, ICI estimation and ICI reduction.

Figure 7:
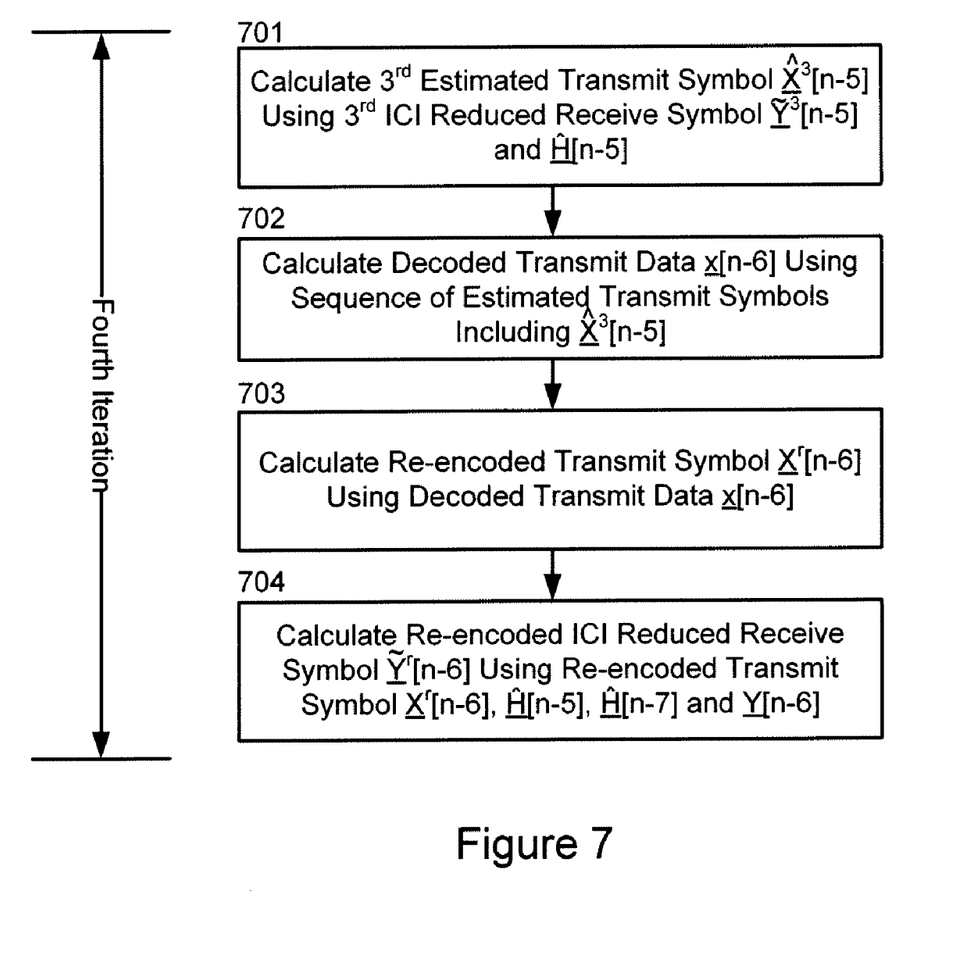
FIG. 7 illustrates an extension of the inter-channel interference method of FIG. 6 adding a fourth iteration with inner decoding.

FIG. 7 outlines an optional fourth iteration that may be used to generate an even further improved ICI reduced receive symbol in a system that may use two levels of forward error correction (FEC). After decoding by an inner FEC decoder, an estimate of the transmit symbol may be used to generate improve ICI reduction. In step 701, a $3^{rd}$ estimated transmit symbol $\hat{X}^3[n-5]$ may be generated from the $3^{rd}$ ICI reduced receive symbol $\tilde{Y}^3[n-5]$ and the interpolated channel estimate $\hat{H}[n-5]$, preferably using a zero-forcing equalizer. In step 702, a decoder for an inner FEC code may generate an estimate of the transmit data x[n-6] using a sequence of past estimated transmit symbols $\hat{X}^3[n-5]$, $\hat{X}^3[n-6]$, $\hat{X}^3[n-7]$, etc. as may be performed in a Viterbi decoder, for example. In FIG. 7, the decoder may incur a delay of one symbol, although in other embodiments a different amount of delay may be incurred. In step 703, the transmit data estimate x[n-6] may be re-encoded to generate a transmit symbol $X'[n-6]$. This re-encoded transmit symbol $X'[n-6]$ may be more accurate than an equivalent estimate $\hat{X}[n-6]$ generated by step 701 in an earlier iteration because of improvements offered by the Viterbi decoder. An ICI reduced channel estimate $\tilde{Y}'[n-6]$ may be generated from the re-encoded transmit symbol $X'[n-6]$, interpolated channel estimates $\hat{H}[n-5]$, $\hat{H}[n-7]$ and the receive symbol Y[n-6] using Equations (3) and (5).

Figure 8:
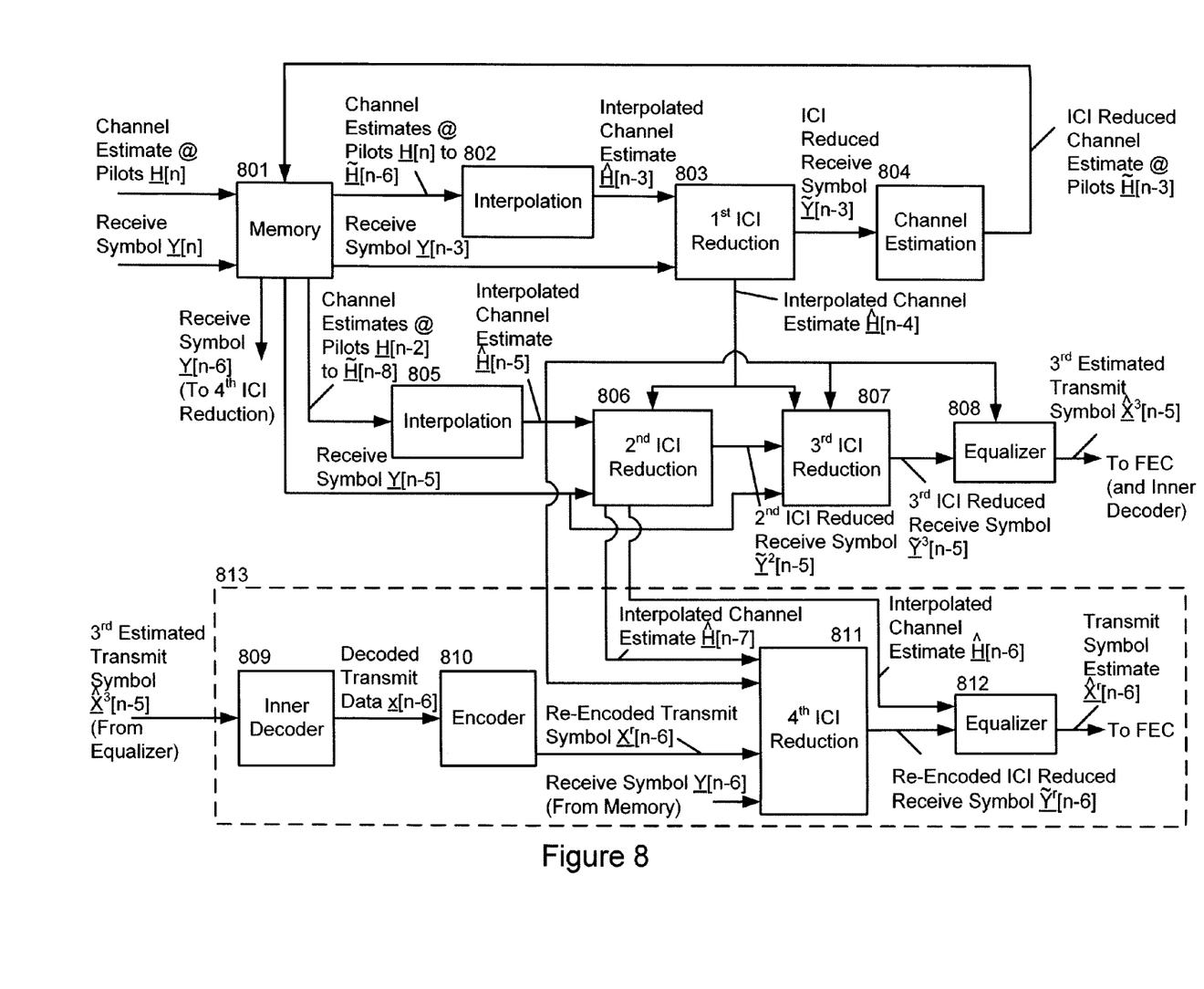
FIG. 8 illustrates an apparatus for inter-channel interference reduction using three or four iterations with feedback.
Figure 9:
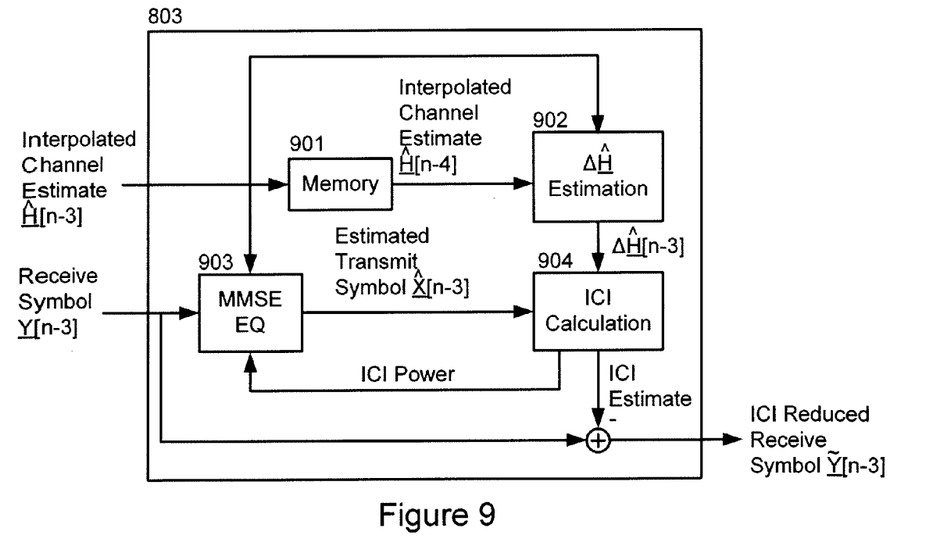
FIG. 9 details a first inter-channel interference reduction iteration of FIG. 8.

FIG. 8 illustrates an exemplary system that includes three iterations of ICI reduction and a fourth optional iteration if using an inner decoder may be used. A memory block 801 may store an channel estimate H[n] generated from a receive symbol Y[n] and an ICI reduced channel estimate Ĥ[n−3] generated by channel estimation block 804 from an ICI reduced receive symbol Ỹ[n−3]. An interpolation filter 802 may generate an interpolated channel estimate Ĥ[n−3] using a first set of channel estimates and ICI reduced channel estimates stored in memory block 801. A first ICI reduction block 803 may generate an ICI reduced receive symbol Ỹ[n−3] based on the interpolated channel estimate Ĥ[n−3] generated by the interpolation filter 802 and the receive symbol Y[n−3] stored in memory block 801. Other estimates needed by the first ICI reduction block 803 to generate the ICI reduced receive symbol Ỹ[n−3] may be stored or generated internally to the block 803 as illustrated in FIG. 9. A channel estimate derivative block 902 may recall from a memory block 901 a previously interpolated channel estimate Ĥ[n−4] required to estimate the derivative ΔĤ[n−3] using Equation (5). An MMSE equalizer 903 may calculate an estimated transmit symbol X̂[n−3] from the receive symbol Y[n−3] stored in memory block 801. An ICI estimation block 904 may estimate ICI for receive symbol Y[n−3] used in the ICI reduction of Equation (3) as well as an estimate of the ICI power used in Equation (7). The ICI estimate may then be subtracted from the receive symbol Y[n−3] to generate the ICI reduced receive symbol Ỹ[n−3].

Figure 10:
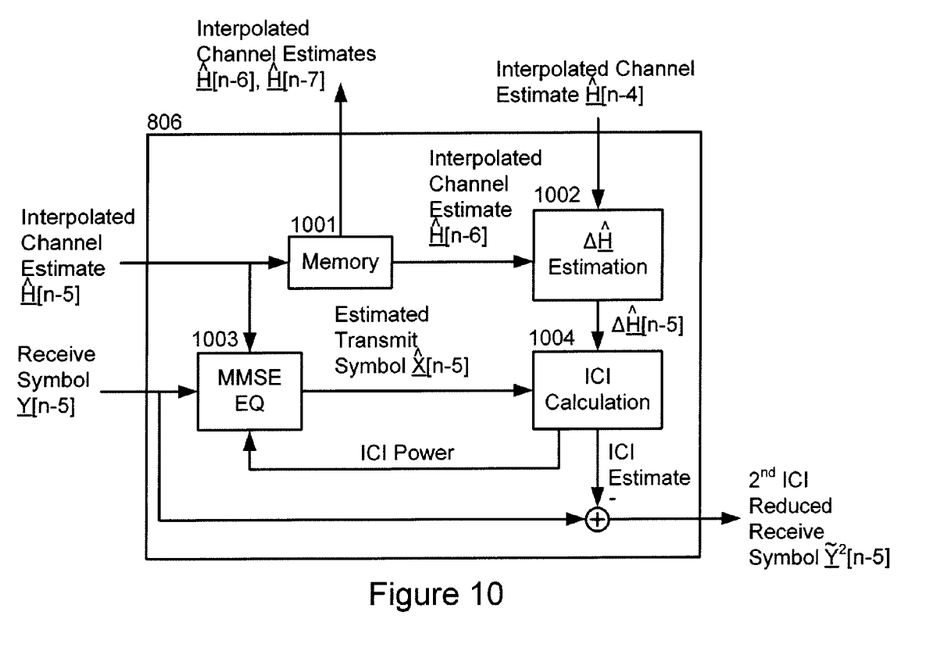
FIG. 10 details a second inter-channel interference reduction iteration of FIG. 8.

Referring back to FIG. 8, for a second iteration of ICI reduction, an interpolation block 805 may generate an interpolated channel estimate Ĥ[n−5] based on a second set of channel estimates and ICI reduced channel estimates stored in memory block 801. The second set may contain more ICI reduced channel estimate than the first set used by the interpolation block 802 for the first iteration, thus providing a more accurate interpolated channel estimate in the second iteration. A second ICI reduction block 806 may generate a $2^{nd}$ ICI reduced receive symbol $\tilde{Y}^2[n-5]$ based on the interpolated channel estimate Ĥ[n−5] and the receive symbol Y[n−5] stored in memory block 801. FIG. 10 illustrates details inside the second ICI reduction block 806. The calculation blocks in side the second ICI reduction block 806 resemble those used in the first ICI reduction block 803 with some additional connections. A channel estimate derivative block 1002 may recall a previously interpolated channel estimate $\hat{H}^2[n-6]$ from a memory block 1001 together with the interpolated channel estimate Ĥ[n−4] stored in memory block 901 of the first ICI reduction block 803 to estimate a derivative ΔĤ[n−5] using Equation (4). An MMSE equalizer 1003 may calculate an estimated transmit symbol X̂[n−5] from the receive symbol Y[n−5] stored in memory block 801. An ICI estimation block 904 may estimate ICI for receive symbol Y[n−5] used in the ICI reduction of Equation (3) as well as an estimate of the ICI power used in Equation (7). The ICI estimate may then be subtracted from the receive symbol Y[n−5] to generate the $2^{nd}$ ICI reduced receive symbol $\tilde{Y}^2[n-5]$.

Figure 11:
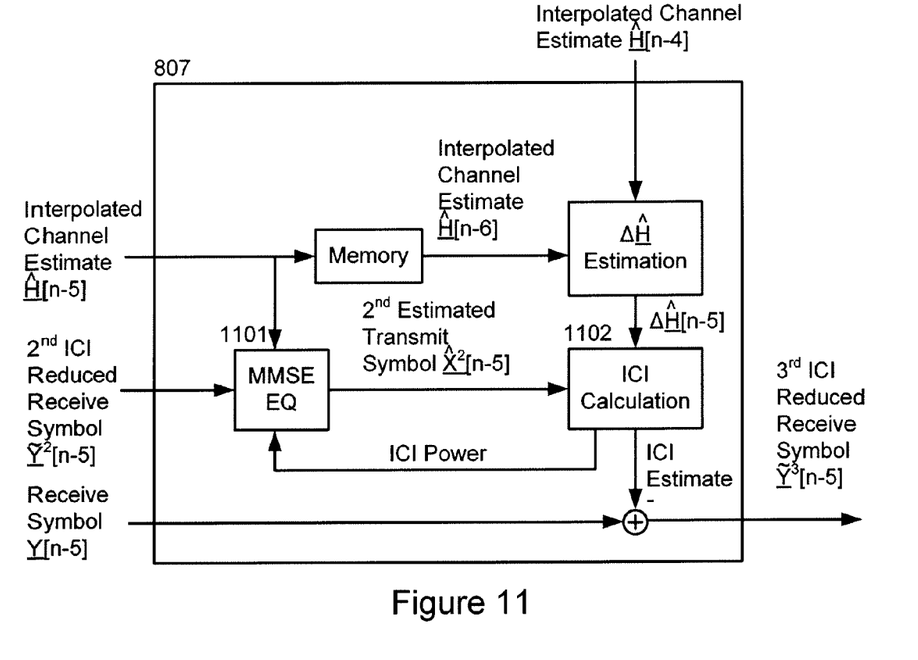
FIG. 11 details a third inter-channel interference reduction iteration of FIG. 8.

Referring back to FIG. 8, a third ICI reduction block 807 may provide a third iteration of ICI reduction by calculating re-calculating ICI for the receive symbol Y[n−5] as detailed in FIG. 11. The third ICI reduction block 807 may perform the same operations as the second ICI reduction block 806 except the $2^{nd}$ ICI reduced receive symbol $\tilde{Y}^2[n-5]$ replaces the receive symbol Y[n−5] as an input to the minimum mean square error equalizer 1101. The MMSE equalizer 1101 outputs a $2^{nd}$ estimated transmit symbol $\hat{X}^2[n-5]$ which may provide a more accurate input to the ICI calculation block 1102. The third ICI reduction block 807 may output a $3^{rd}$ ICI reduced receive symbol $\tilde{Y}^3[n-5]$, which may contain less ICI than the $2^{nd}$ ICI reduced receive symbol $\tilde{Y}^2[n-5]$ because of more accurate ICI estimation. An equalizer 808, preferably zero-forcing, may follow the $3^{rd}$ ICI reduction block 807 and may generate a $3^{rd}$ estimated transmit symbol $\hat{X}^3[n-5]$ from the $3^{rd}$ ICI reduced receive symbol $\tilde{Y}^3[n-5]$ and the interpolated channel estimate Ĥ[n−5]. The $3^{rd}$ estimated transmit symbol $\hat{X}^3[n-5]$ may be input to a receive FEC decoder (not shown).

Figure 12:
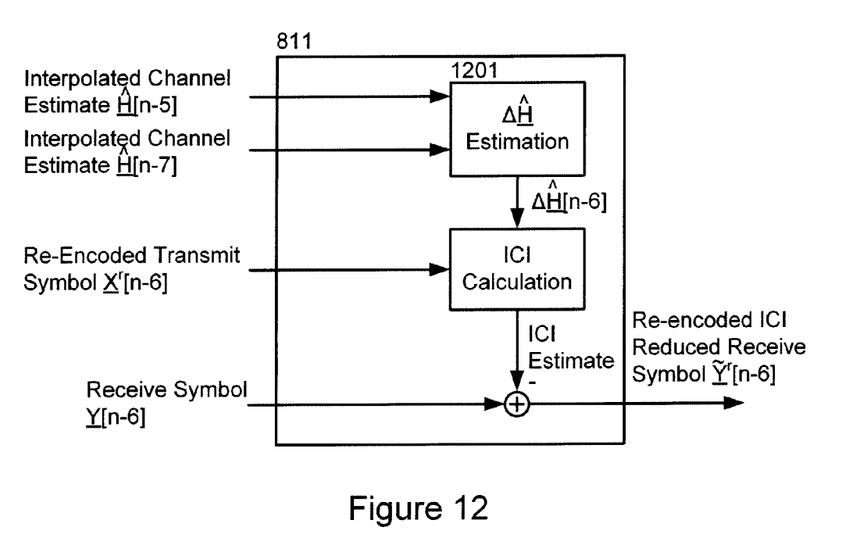
FIG. 12 details a fourth inter-channel interference reduction iteration of FIG. 8.

In a communication system that may use two levels of error correction, i.e. an inner FEC code and an outer FEC code, an inner FEC decoder may provide an additional level of improvement for ICI reduction. An optional fourth iteration of ICI reduction may be performed as illustrated by block 813. The $3^{rd}$ estimated transmit symbol $\hat{X}^3[n-5]$ output by the equalizer 808 may be input to an inner decoder 809 resulting in a set of decoded transmit data x[n−6] based on a sequence of past $3^{rd}$ estimated transmit symbols. The inner decoder 809 illustrated incurs a delay of one symbol, although longer delays may be incurred in other embodiments. An encoder 810 may re-encode the decoded transmit data x[n−6] forming a re-encoded transmit symbol X'[n−6], which may be more accurate than a previously calculated transmit symbol estimate X̂[n−6] output by equalizer 808 one symbol time earlier. A fourth ICI reduction block 811 may generate an ICI reduced receive symbol Ỹ'[n−6] by calculating ICI using the re-encoded transmit symbol X'[n−6] and interpolated channel estimates Ĥ[n−5], Ĥ[n−7] and by subtracting the ICI from the receive symbol Y[n−6]. FIG. 12 illustrates an exemplary set of calculation blocks inside the fourth ICI reduction block 811. The channel estimate derivative block 1201 may use Equation (4) to determine ΔĤ[n−6]. An equalizer 812, preferably zero-forcing, may follow the fourth ICI reduction block 811 generating a transmit symbol estimate X̂'[n−6] from the ICI reduced receive symbol Ỹ'[n−6] and the interpolated channel estimate Ĥ[n−6].

Note that the exemplary embodiments shown in FIGS. 8-12 contain a number of computational blocks that may be shared or distributed in some implementations. For example, the number of memory blocks distributed throughout a design may differ from the number shown. One or more memory blocks may suffice. Similarly calculation blocks, such as the interpolation filters or the equalizers may be shared or distributed. Also one or more ICI reduction blocks may be configured to perform the iterative calculations sequentially. A variety of implementations similar to that described may be considered equivalent to the ICI reduction apparatus detailed above.

Although illustrative embodiments of the invention have been described in detail herein with reference to the accompanying figures, it is to be understood that the invention is not limited to those precise embodiments. The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. An apparatus in a multiple sub-carrier digital communication receiver for reducing inter-channel interference (ICI), the apparatus including:
   a channel estimation block for calculating channel estimates, the channel estimates being calculated based on one of receive symbols and ICI reduced receive symbols;

an interpolation block for calculating interpolated channel estimates, the interpolated channel estimates being calculated based on a set of channel estimates; and an ICI reduction block for calculating ICI reduced receive symbols, the ICI reduced receive symbols being calculated based on a set of interpolated channel estimates and one of the receive symbols and the ICI reduced receive symbols, wherein the ICI reduction block includes:

a first equalizer for determining a first transmit symbol estimate based on a first receive symbol and the set of interpolated channel estimates;

a channel estimate time derivative block for calculating a channel estimate time derivative based on a difference between a first interpolated channel estimate and a second interpolated channel estimate in the set of interpolated channel estimates;

an ICI estimation block for generating an ICI estimate based on the first transmit symbol estimate and the channel estimate time derivative; and a summation device for calculating an ICI reduced receive symbol based on a difference between the first receive symbol and the ICI estimate.

2. The apparatus of claim 1 further including:
a first memory for storing the channel estimates; and
a second memory for storing the interpolated channel estimates.

3. The apparatus of claim 1, wherein the channel estimation block calculates the channel estimates at a set of sub-carriers using a pre-determined set of pilot symbols.

4. The apparatus of claim 3, wherein the interpolation block includes a Wiener interpolation filter for calculating the interpolated channel estimates using the set of channel estimates.

5. The apparatus of claim 4, wherein the Wiener interpolation filter calculates a one-dimensional interpolation in a time direction and a one-dimensional interpolation in a frequency direction.

6. The apparatus of claim 1, further including:
a second equalizer for determining a second transmit symbol estimate based on a third interpolated channel estimate in the set of interpolated channel estimates and the ICI reduced receive symbol.

7. The apparatus of claim 6, further including:
a decoder for generating a set of decoded transmit data using a sequence of transmit symbol estimates that include the second transmit symbol estimate;
an encoder for calculating a re-encoded transmit symbol using the set of decoded transmit data; and
a second ICI reduction block for calculating a re-encoded ICI reduced receive symbol based on the re-encoded transmit symbol and a second receive symbol.

8. The apparatus of claim 7, further including:
a third equalizer for determining a third transmit symbol estimate based on the re-encoded ICI reduced receive symbol and a fourth interpolated channel estimate in the set of interpolated channel estimates.

9. A method for reducing inter-channel interference (ICI) in a multiple sub-carrier digital communication receiver, the method including:
calculating channel estimates based on one of receive symbols and ICI reduced receive symbols;
generating interpolated channel estimates using sets of channel estimates; and
determining ICI reduced receive symbols using a set of interpolated channel estimates and one of the receive symbols and the ICI reduced receive symbols, wherein determining the ICI reduced receive symbols includes:
determining a first transmit symbol estimate by equalizing a first receive symbol using the set of interpolated channel estimates;
calculating a channel estimate time derivative based on a difference between a first interpolated channel estimate and a second interpolated channel estimate in the set of interpolated channel estimates;
generating an ICI estimate based on the first transmit symbol estimate and the channel estimate time derivative; and
determining an ICI reduced receive symbol based on a difference between the first receive symbol and the ICI estimate.

10. The method of claim 9, further including:
storing the channel estimates and the interpolated channel estimates in one or more memory blocks.

11. The method of claim 9, wherein calculating the channel estimates uses a set of pre-determined pilot symbols at a set of sub-carriers.

12. The method of claim 9, wherein generating the interpolated channel estimates uses a Wiener interpolation filter operating on a set of calculated channel estimates.

13. The method of claim 12, wherein the Wiener interpolation filter calculates a one-dimensional interpolation in a time direction and a one-dimensional interpolation in a frequency direction.

14. The method of claim 9, further including:
determining a second transmit symbol estimate based on a third interpolated channel estimate in the set of interpolated channel estimates and the ICI reduced receive symbols.

15. The method of claim 14, further including:
generating a set of decoded transmit data using a sequence of transmit symbol estimates that include the second transmit symbol estimate;
calculating a re-encoded transmit symbol using the set of decoded transmit data; and
calculating a re-encoded ICI reduced receive symbol based on the re-encoded transmit symbol and a second receive symbol.

16. The method of claim 15, further including:
determining a third transmit symbol estimate based on the re-encoded ICI reduced receive symbol and a fourth interpolated channel estimate in the set of interpolated channel estimates.

* * * * *